(12) United States Patent
Fielder et al.

(10) Patent No.: US 8,408,312 B2
(45) Date of Patent: Apr. 2, 2013

(54) COMPACT CABLE SUSPENDED PUMPING SYSTEM FOR DEWATERING GAS WELLS

(75) Inventors: Lance I. Fielder, Sugar Land, TX (US); Christian Carstensen, Aachen (DE); Rik De Doncker, Leuven (BE); Helge Brauer, Cologne (DE); Holger Franz, Aachen (DE); Johannes Schmidt, Aachen (DE); Benjamin Eduard Wilkosz, Aachen (DE)

(73) Assignee: Zeitecs B.V., Rijswijk, (NL)

( * ) Notice: Subject to any disclaimer, the term of this patent is extended or adjusted under 35 U.S.C. 154(b) by 231 days.

(21) Appl. No.: 12/795,512

(22) Filed: Jun. 7, 2010

(65) Prior Publication Data
US 2011/0297391 A1  Dec. 8, 2011

(51) Int. Cl.
*E21B 43/00* (2006.01)
(52) U.S. Cl. .................... 166/369; 166/105
(58) Field of Classification Search ............ 166/369, 166/68.5, 105
See application file for complete search history.

(56) References Cited

U.S. PATENT DOCUMENTS

| | | |
|---|---|---|
| 4,352,394 A | 10/1982 | Zehren |
| 4,583,923 A | 4/1986 | James |
| 4,928,771 A | 5/1990 | Vandevier |
| 5,086,196 A | 2/1992 | Brookbank et al. |
| 5,145,007 A | 9/1992 | Dinkins |
| 5,191,173 A | 3/1993 | Sizer et al. |
| 5,207,273 A | 5/1993 | Cates et al. |
| 5,269,377 A | 12/1993 | Martin |
| 5,708,337 A | 1/1998 | Breit et al. |
| 5,769,160 A | 6/1998 | Owens |
| 5,906,242 A | 5/1999 | Bruewer et al. |
| 6,143,988 A | 11/2000 | Neuroth et al. |
| 6,168,388 B1 | 1/2001 | Hughes et al. |
| 7,396,216 B2 | 7/2008 | Blauch et al. |
| 7,857,604 B2 | 12/2010 | Shaw et al. |
| 2002/0153141 A1 | 10/2002 | Hartman et al. |
| 2004/0183491 A1 | 9/2004 | Sidey |
| 2004/0217665 A1 | 11/2004 | Hans |
| 2006/0151211 A1 | 7/2006 | Coenen et al. |
| 2007/0175633 A1 | 8/2007 | Kosmala et al. |
| 2007/0252717 A1 | 11/2007 | Fielder |

(Continued)

FOREIGN PATENT DOCUMENTS

| | | |
|---|---|---|
| CN | 201374627 Y | 12/2009 |
| CN | 201478959 U | 5/2010 |

(Continued)

OTHER PUBLICATIONS

Baker Hughes—Centrilift Product Report, Alternative Deployed ESP System, Cable/Rod Deployed ESP Systems, Sep. 2008, 6 pages.

(Continued)

*Primary Examiner* — William P Neuder
(74) *Attorney, Agent, or Firm* — Patterson & Sheridan, L.L.P.

(57) ABSTRACT

A method of unloading liquid from a reservoir includes deploying a pumping system into a wellbore to a location proximate the reservoir using a cable. The pumping system includes a multi-section motor, an isolation device, and a pump. The method further includes supplying a power signal from the surface to the motor via the cable and sequentially operating each section of the motor to mimic a multi-phase motor, thereby driving the pump and lowering a liquid level in the tubular string to a level proximate the reservoir.

23 Claims, 6 Drawing Sheets

U.S. PATENT DOCUMENTS

| | | |
|---|---|---|
| 2008/0236821 A1 | 10/2008 | Fielder |
| 2009/0010783 A1 | 1/2009 | Appel et al. |
| 2009/0056939 A1 | 3/2009 | Hackworth et al. |
| 2009/0175737 A1 | 7/2009 | Intelisano |
| 2010/0206554 A1 | 8/2010 | Neuhaus |
| 2010/0288493 A1 | 11/2010 | Fielder et al. |
| 2010/0288501 A1 | 11/2010 | Fielder et al. |
| 2011/0300008 A1 | 12/2011 | Fielder et al. |

FOREIGN PATENT DOCUMENTS

| | | |
|---|---|---|
| GB | 2358740 A | 8/2001 |
| GB | 2445859 A | 7/2008 |
| SU | 1643794 A1 * | 4/1991 |
| WO | WO-2004/113670 A2 | 12/2004 |
| WO | WO-2006/136202 | 12/2006 |
| WO | 2009077714 A1 | 6/2009 |

OTHER PUBLICATIONS

International Search Report and Written Opinion dated Oct. 25, 2012, International Application No. PCT/ US2011/038417.

* cited by examiner

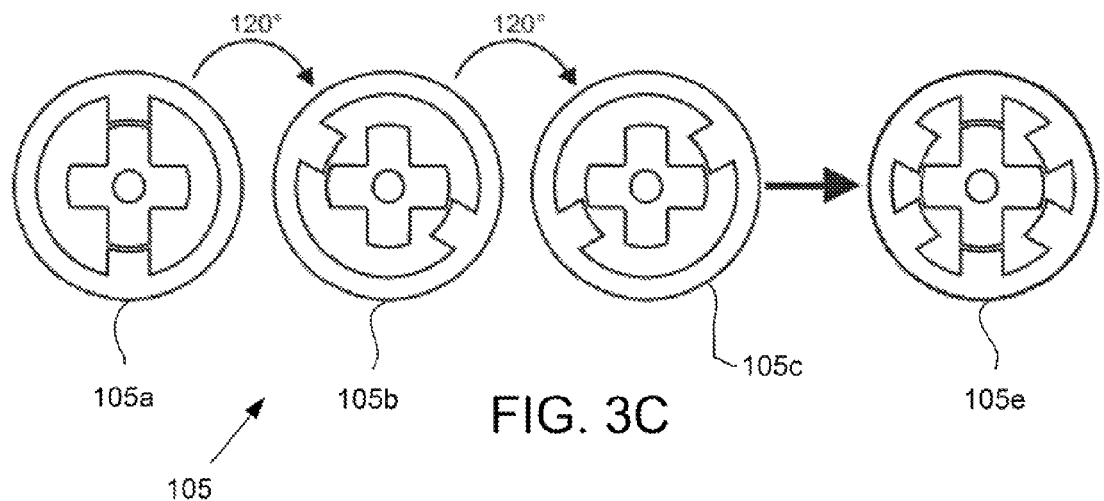
FIG. 3C
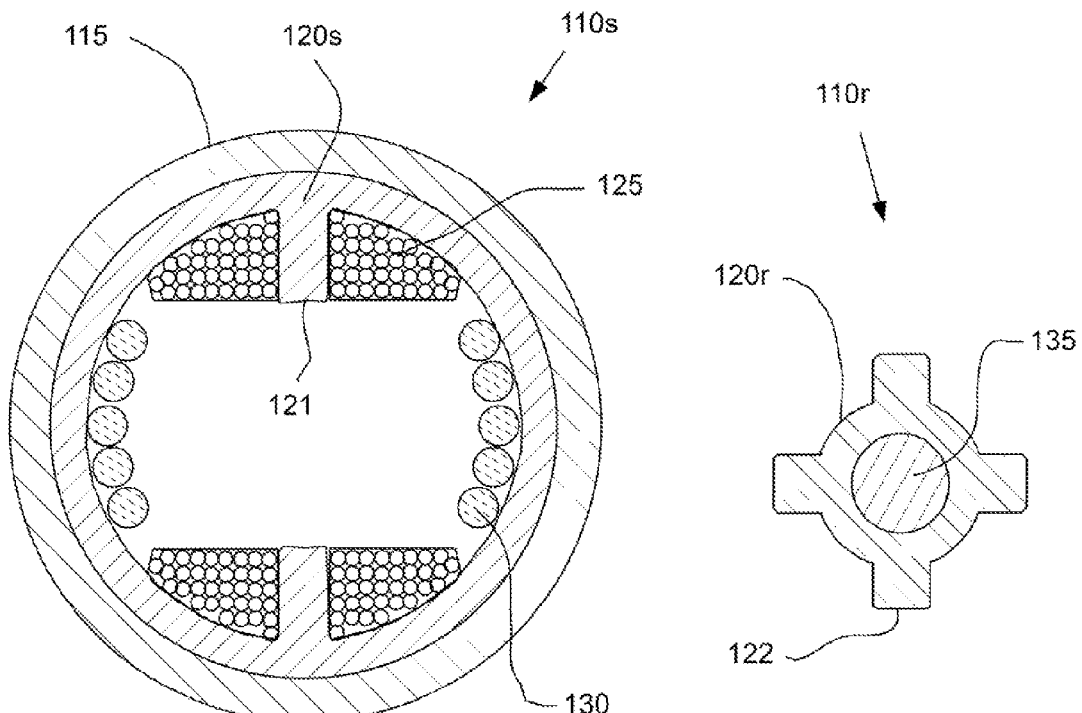
FIG. 3D
FIG. 3E

COMPACT CABLE SUSPENDED PUMPING SYSTEM FOR DEWATERING GAS WELLS

BACKGROUND OF THE INVENTION

1. Field of the Invention

Embodiments of the present invention generally relate to a compact cable suspended pumping system for dewatering gas wells.

2. Description of the Related Art

As natural gas wells mature, many experience a decrease in production due to water build up in the annulus creating back pressure on the reservoir. The gas industry have utilized varying technologies to alleviate this problem, however most do not meet the economic hurdle as they require intervention such as pulling the tubing string.

SUMMARY OF THE INVENTION

Embodiments of the present invention generally relate to a compact cable suspended pumping system for dewatering gas wells. In one embodiment, a method of unloading liquid from a reservoir includes deploying a pumping system into a wellbore to a location proximate the reservoir using a cable. The pumping system includes a multi-section motor, an isolation device, and a pump. The method further includes supplying a power signal from the surface to the motor via the cable and sequentially operating each section of the motor to mimic a multi-phase motor, thereby driving the pump and lowering a liquid level in the tubular string to a level proximate the reservoir.

In another embodiment, a pumping system includes a submersible multi-section electric motor operable to rotate a drive shaft. Each section is incrementally oriented so that the sections are operable to mimic a multi-phase motor. The pumping system further includes a pump rotationally connected to the drive shaft; an isolation device operable to engage a tubular string, thereby fluidly isolating an inlet of the pump from an outlet of the pump and rotationally connecting the motor and the pump to the tubular string; and a cable having two or less conductors, a strength sufficient to support the motor, the pump, and the isolation device, and in electrical communication with the motor.

In another embodiment, a motor includes two or more sections. Each section includes a submersible tubular housing and a stator core disposed within the housing. The stator core has one or more lobes and each lobe has a winding wrapped therearound. The motor further includes a rotor disposed within the housing and including a shaft and a rotor core. The rotor core has two or more lobes. Each section is incrementally oriented so that the sections may be operated to mimic a multi-phase motor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3C is a schematic of the multi-section motor mimicking operation of a multi-phase motor. FIG. 3D is a cross section of the stator. FIG. 3E is a cross section of the rotor.

DETAILED DESCRIPTION

Figure 1A:
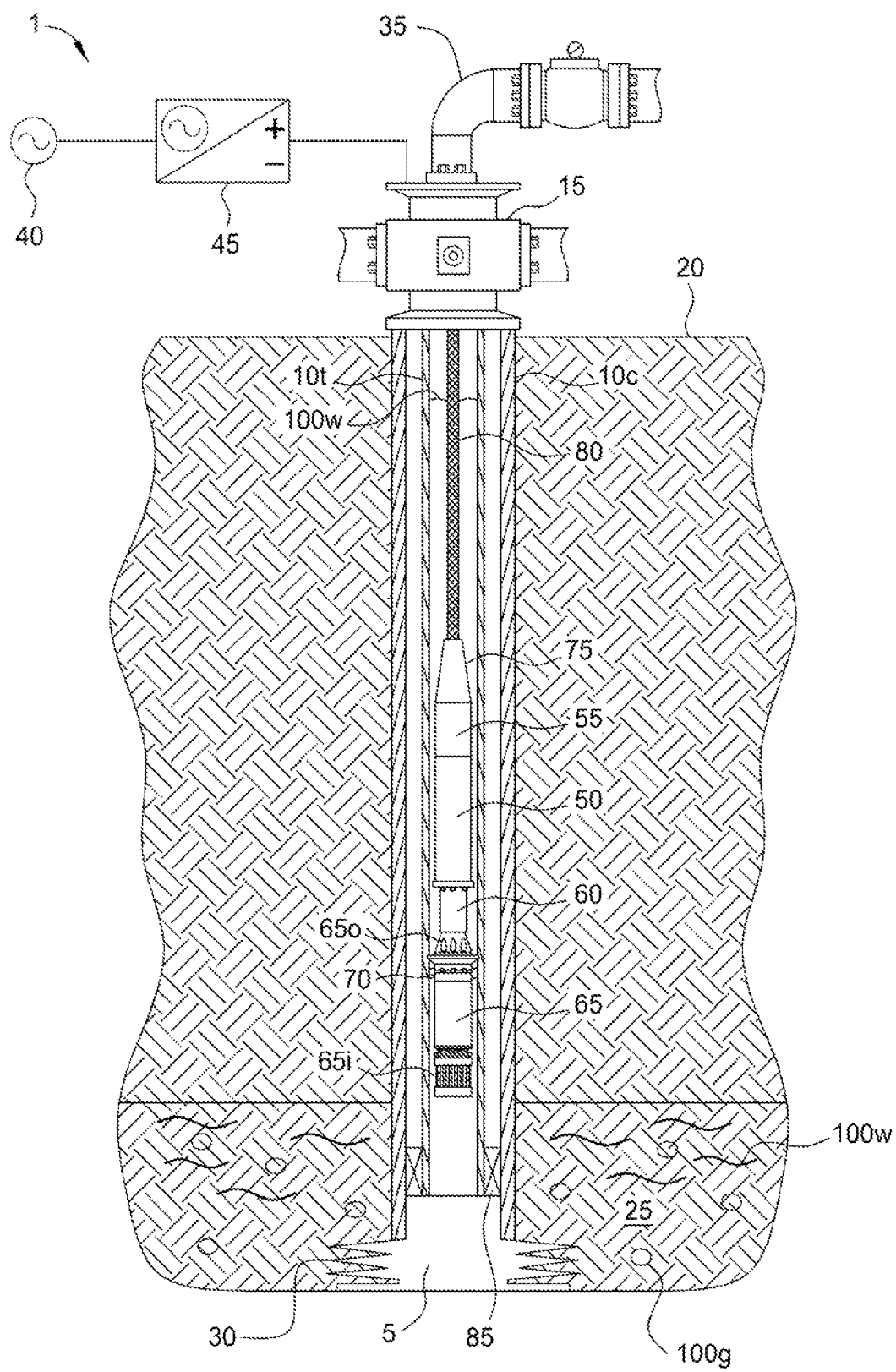
FIG. 1A illustrates a pumping system, such as an electric submersible pumping system, deployed in a wellbore, according to one embodiment of the present invention.

FIG. 1A illustrates a pumping system, such as an electric submersible pumping system (ESP) 1, deployed in a wellbore 5, according to one embodiment of the present invention. The wellbore 5 has been drilled from a surface of the earth 20 or floor of the sea (not shown) into a hydrocarbon-bearing (i.e., natural gas 100g) reservoir 25. A string of casing 10c has been run into the wellbore 5 and set therein with cement (not shown). The casing 10c has been perforated 30 to provide to provide fluid communication between the reservoir 25 and a bore of the casing 10. A wellhead 15 has been mounted on an end of the casing string 10c. An outlet line 35 extends from the wellhead 15 to production equipment (not shown), such as a separator. A production tubing string 10t has been run into the wellbore 5 and hung from the wellhead 15. A production packer 85 has been set to isolate an annulus between the tubing 10t and the casing 10c from the reservoir 25. The reservoir 25 may be self-producing until a pressure of the gas 100g is no longer sufficient to transport a liquid, such as water 100w, to the surface. A level of the water 100w begins to build in the production tubing 10t, thereby exerting hydrostatic pressure on the reservoir 25 and diminishing flow of gas 100g from the reservoir 25.

Figure 1B:
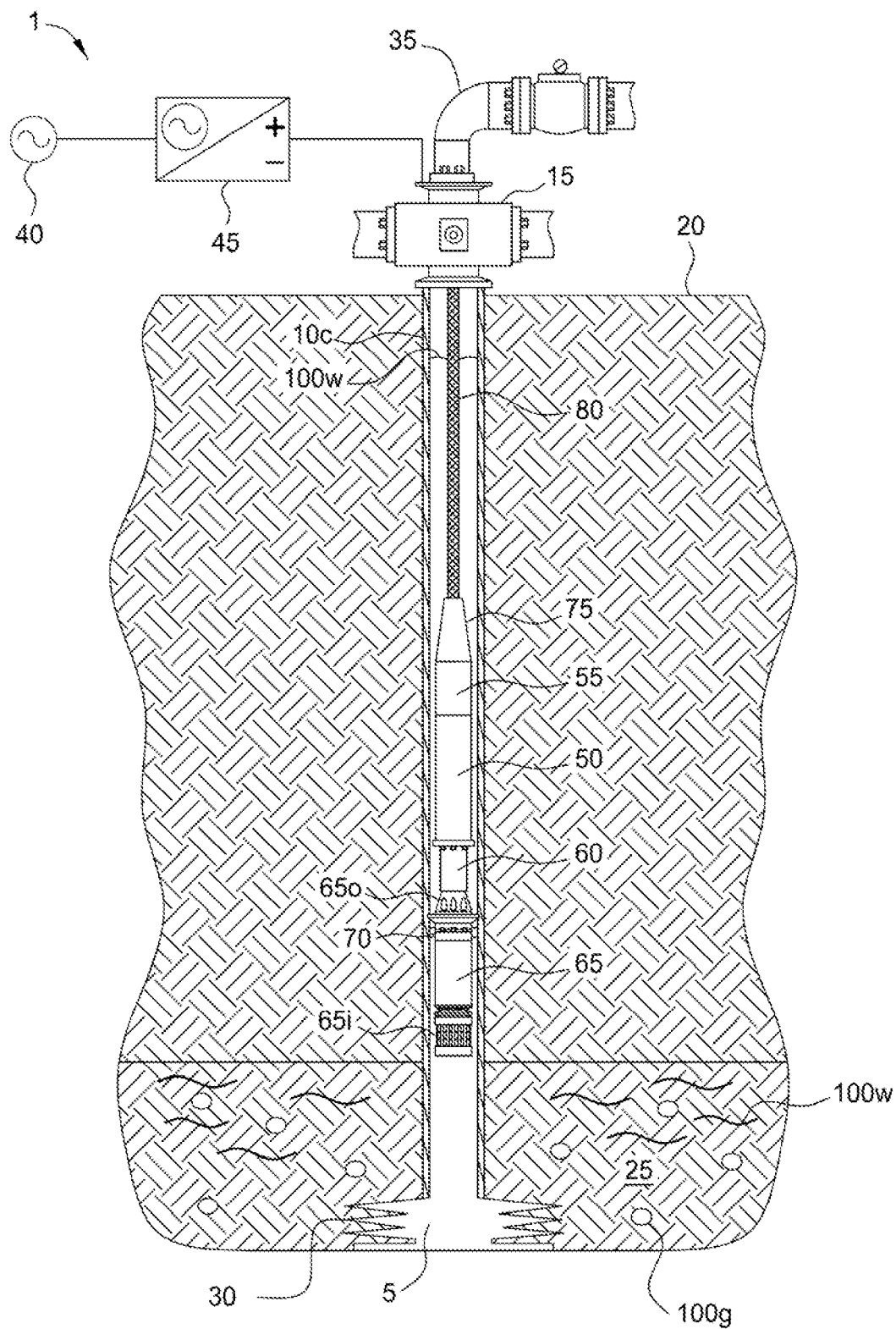
FIG. 1B illustrates an electric submersible pumping system deployed in a wellbore, according to another embodiment of the present invention.

FIG. 1B illustrates the ESP 1 deployed in a wellbore 5, according to another embodiment of the present invention. In this embodiment, the casing 10c has been used to produce fluid from the reservoir 25 instead of installing production tubing. In this scenario, the isolation device 70 may be set against the casing 10c and the pump 65 may discharge the water 100w to the surface 20 via a bore of the casing 10c.

The ESP 1 may include a surface controller 45, an electric motor 50, a power conversion module (PCM) 55, a seal section 60, a pump 65, an isolation device 70, a cablehead 75, and a power cable 80. Housings of each of the downhole components 50-75 may be longitudinally and rotationally connected, such as with flanged or threaded connections. The downhole component housings may be made from a corrosion resistant metal or alloy, such as galvanized steel, stainless steel, or a nickel based alloy. Since the downhole components 50-75 may be deployed within the tubing 10t, the components 50-80 may be compact, such as having a maximum outer diameter less than or equal to two or one and three-quarter inches (depending on the inner diameter of the tubing 10t).

The surface controller 45 may be in electrical communication with an alternating current (AC) power source 40, such as a generator on a workover rig (not shown). The surface controller 45 may include a transformer (not shown) for stepping the voltage of the AC power signal from the power source 40 to a medium voltage (V) signal. The medium voltage may be greater than or equal to one kV, such as five to ten kV. The surface controller may further include a rectifier for converting the medium voltage AC signal to a medium voltage direct current (DC) power signal for transmission downhole via the power cable 80. The surface controller 45 may further include a data modem (not shown) and a multiplexer (not shown) for modulating and multiplexing a data signal to/from the PCM 55 with the DC power signal. The surface controller 45 may further include an operator interface (not shown), such as a video-display, touch screen, and/or USB port.

The cable 80 may extend from the surface controller 45 through the wellhead 15 or connect to leads which extend through the wellhead 15 and to the surface controller 45. The cable 80 may be received by slips or a clamp (not shown) disposed in or proximate to the wellhead 15 for longitudinally connecting the cable 80 to the wellhead 15 during operation of the ESP 1. The cable 80 may extend into the wellbore 5 to the cablehead 75. Since the power signal may be DC, the cable 80 may only include two conductors arranged coaxially.

Figure 2A:
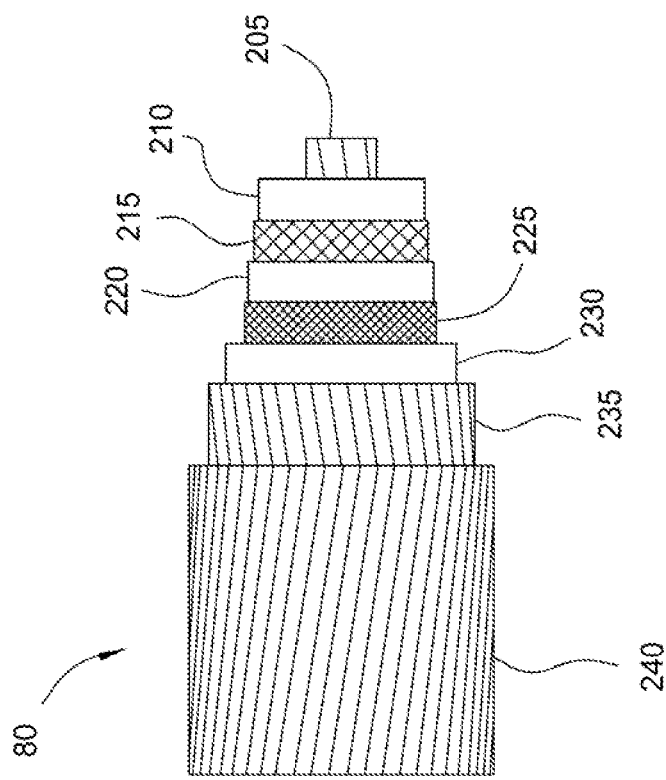
FIG. 2A is a layered view of the power cable.
Figure 2B:
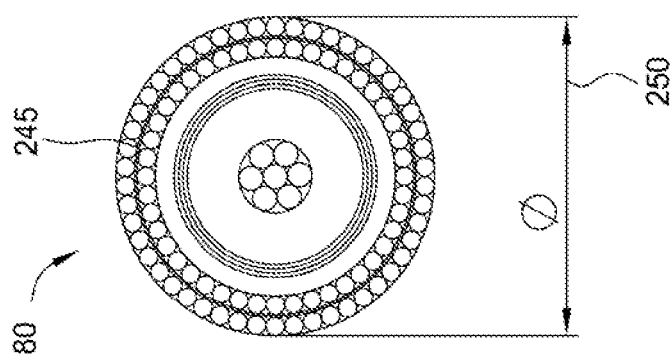
FIG. 2B is an end view of the power cable.

FIG. 2A is a layered view of the power cable 80. FIG. 2B is an end view of the power cable 80. The cable 80 may include an inner core 205, an inner jacket 210, a shield 215, an outer jacket 230, and armor 235, 240. The inner core 205 may be the first conductor and made from an electrically conductive material, such as aluminum, copper, aluminum alloy, or copper alloy. The inner core 205 may be solid or stranded. The inner jacket 210 may electrically isolate the core 205 from the shield 215 and be made from a dielectric material, such as a polymer (i.e., an elastomer or thermoplastic). The shield 215 may serve as the second conductor and be made from the electrically conductive material. The shield 215 may be tubular, braided, or a foil covered by a braid. The outer jacket 230 may electrically isolate the shield 215 from the armor 235, 240 and be made from an oil-resistant dielectric material. The armor may be made from one or more layers 235, 240 of high strength material (i.e., tensile strength greater than or equal to two hundred kpsi) to support the deployment weight (weight of the cable and the weight of the downhole components 50-75) so that the cable 80 may be used to deploy and remove the downhole components 50-75 into/from the wellbore 5. The high strength material may be a metal or alloy and corrosion resistant, such as galvanized steel, stainless steel, or a nickel alloy depending on the corrosiveness of the gas 100g. The armor may include two contra-helically wound layers 235, 240 of wire or strip.

Additionally, the cable 80 may include a sheath 225 disposed between the shield 215 and the outer jacket 230. The sheath 225 may be made from lubricative material, such as polytetrafluoroethylene (PTFE) or lead and may be tape helically wound around the shield 215. If lead is used for the sheath, a layer of bedding 220 may insulate the shield 215 from the sheath and be made from the dielectric material. Additionally, a buffer 245 may be disposed between the armor layers 235, 240. The buffer 245 may be tape and may be made from the lubricative material.

Due to the coaxial arrangement, the cable 80 may have an outer diameter 250 less than or equal to one and one-quarter inches, one inch, or three-quarters of an inch.

Additionally, the cable 80 may further include a pressure containment layer (not shown) made from a material having sufficient strength to contain radial thermal expansion of the dielectric layers and wound to allow longitudinal expansion thereof. The material may be stainless steel and may be strip or wire. Alternatively, the cable 80 may include only one conductor and the tubing 10t may be used for the other conductor.

The cable 80 may be longitudinally connected to the cablehead 75. The cablehead 75 may also include leads (not shown) extending therethrough. The leads may provide electrical communication between the conductors of the cable 80 and the PCM 55.

Figures 3A, 3B:
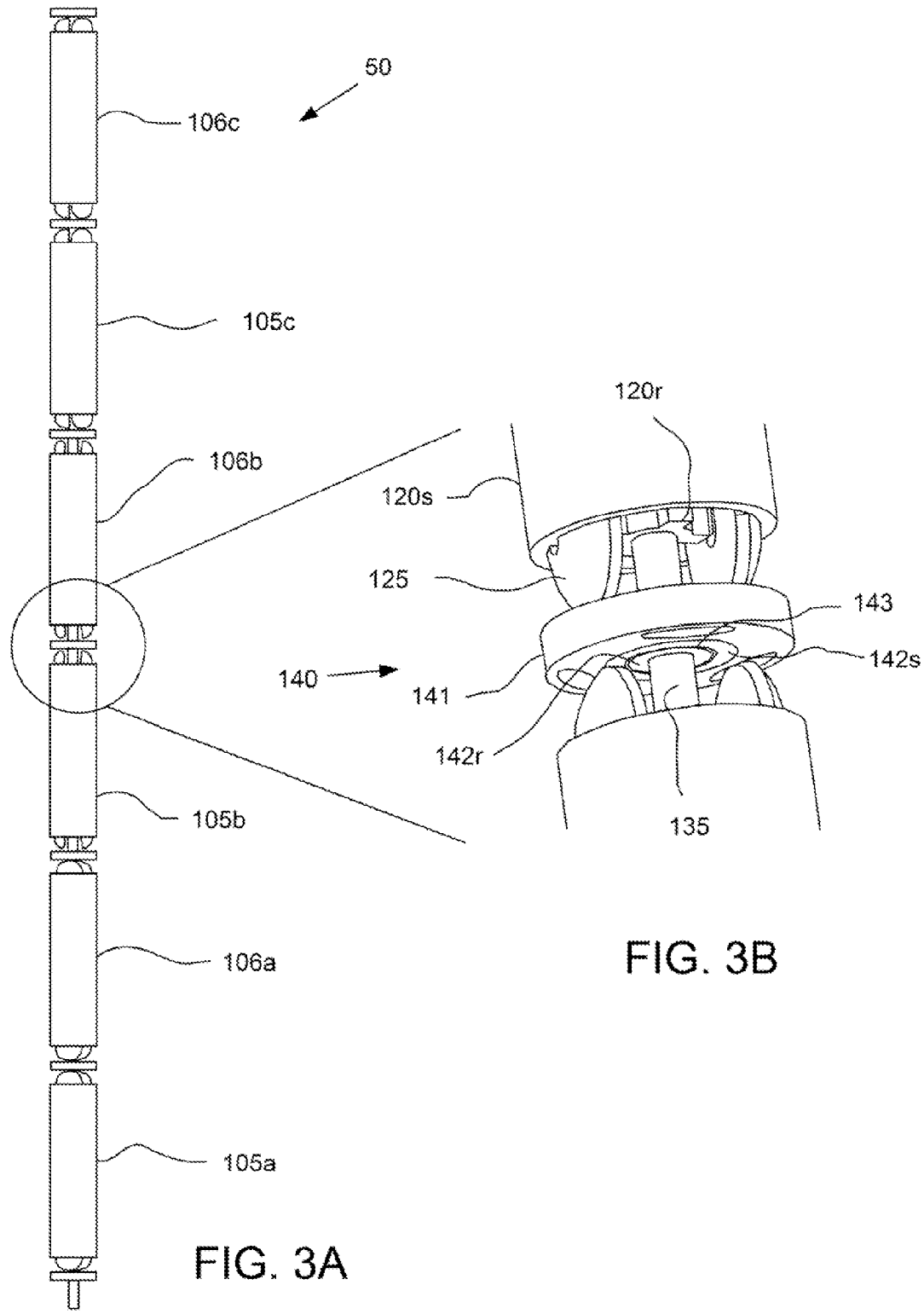
FIG. 3A is an external view of the motor minus the housing.
FIG. 3B is an enlargement of a portion of FIG. 3A.

FIG. 3A is an external view of the motor 50 minus the housing. FIG. 3B is an enlargement of a portion of FIG. 3A. FIG. 3C is a schematic of the multi-section motor 50 mimicking operation of a multi-phase motor. FIG. 3D is a cross section of the stator 110s. FIG. 3E is a cross section of the rotor 110r.

The motor 50 may be filled with a dielectric, thermally conductive liquid lubricant, such as mineral oil. The motor 50 may be cooled by thermal communication with the reservoir water 100w. The motor 50 may include a thrust bearing (not shown) for supporting a drive shaft 135. In operation, the motor 50 may rotate the shaft 135, thereby driving the pump 65. The motor shaft 135 may be directly (no gearbox) connected to a rotor 160 of the pump via a shaft of the motor seal 60. As discussed above, since the motor 50 may be compact, the motor may operate at high speed so that the pump may generate the necessary head to pump the water 100w to the surface 20. High speed may be greater than or equal to ten or fifteen thousand revolutions per minute (RPM).

The motor 50 may include two or more sections 105a-c, 106a-c. Each section 105a-c, 106a-c may include a rotor 110r and a stator 110s. The stator 110s may include the housing 115, a core 120s, windings 125, and leads 130. The housing 115 may be tubular and have a bore therethrough. Each section 105a-c, 106a-c may be longitudinally and rotationally connected, such as by flanges or threads (not shown). The core 120s may include one or more lobes 121 (two shown). Each lobe 121 may be wound and the windings 125 of opposing lobes 121 may be connected (not shown) in series or parallel to define a phase. The motor 50 may further include one or more sets, such as a first set 105 and a second set 106 (not shown) of sections 105a-c, 106a-c. The stator 110s of each section 105a-c, 106a-c of each set 105, 106 may be incrementally oriented relative to each other based on a three-hundred and sixty degree sum. For example, for three sections, each section 105a-c, 106a-c may be shifted by one-hundred twenty degrees relative to other sections of the set. Alternatively, each rotor 110r of each section 105a-c, 106a-c of each set 105, 106 may be shifted instead of shifting the stators 110s.

Each section 105a-c, 106a-c may be electrically connected to the PCM 55 by the leads 130. Respective sections (i.e., 105a, 106a) of each set 105, 106 may correspond, thereby operating as a single phase. The corresponding sections of the sets 105, 106 may be electrically connected to the PCM 55 in parallel or series. Shifted sections (i.e., 105a, b) of each set 105, 106 may be connected to the PCM 55 in parallel. Each set 105, 106 may be controlled by the PCM 55 to mimic one or more multi-phase motors 105e (may be viewed as a single motor or two motors in series), such as a three-phase (six stator lobes) motor. Other than for the orientation, each of the sections 105a-c, 106a-c may be identical, thereby forming a modular motor 50.

The motor 50 may be a switched reluctance motor (SRM). Each rotor 110r may include a shaft 135 and a core 120r. The shaft 135 may be made from a metal or alloy, such as plain carbon or low alloy steel, stainless steel, or a nickel based alloy. The core 120r may have two or more lobes 122, such as four, each spaced apart by ninety degree increments. Each of the cores 120s, 120r may be laminates. Each layer of the laminates may be made from a metal or alloy, such as silicon steel. The layers may be aligned and then pressed together to form one of the cores 120r,s. The windings 125 may then be wrapped around each lobe 121. The stator core 120s may be longitudinally and rotationally connected to the housing 115, such as by a key and keyway (not shown) and fasteners. The housing 115 may include an external indicator (not shown), such as a groove or protrusion, to facilitate orientation of the sections 105a-c, 106a-c with respect to one another. The rotor core 120r may be longitudinally and rotationally connected to the shaft 135, such as by a key, keyway, and fasteners or an interference fit. Each of the leads 130 and windings 125 may include a core made from an electrically conductive material, as discussed above, and be jacketed by a dielectric material, as discussed above.

Each section 105a-c, 106a-c may further include a bearing 140, such as a radial bearing, for supporting rotation of the shaft 135 relative to the housing 115. The bearing 140 may be a rolling element bearing, such as a ball bearing. The bearing 140 may include a gland 141 housing an outer race 142s. The gland 141 may be connected (not shown) to the housing 115 and the outer race 142s connected to the gland 141. The bearing 140 may further include an inner race 142r connected to the shaft 135. Balls 143 (schematically shown) may be disposed between the races 142r,s and lubricant may be sealed within the races. Alternatively, the bearing 140 may be a hydrodynamic bearing, as discussed below.

The PCM 55 may include a motor controller (not shown), a modem (not shown), and demultiplexer (not shown). The modem and demultiplexer may demultiplex a data signal from the DC power signal, demodulate the signal, and transmit the data signal to the motor controller. The motor controller may receive the medium voltage DC signal from the cable and sequentially energize the shifted sections 105a-c (& 106a-c) of the motor 50, thereby supplying an output signal to drive the particular section of the motor and coordinating operation of each set of sections as a multi-phase motor. The output signal may be stepped, trapezoidal, or sinusoidal. The motor controller may include a logic circuit for simple control (i.e. predetermined speed) or a microprocessor for complex control (i.e., variable speed drive and/or soft start capability). The motor controller may use one or two-phase excitation, be unipolar or bi-polar, and control the speed of the motor by controlling the switching frequency. The motor controller may include an asymmetric bridge or half-bridge.

Alternatively, the motor 50 may be permanent magnet motor, such as a brushless DC motor (BLDC) made in a similar multi-section fashion. The BLDC motor may include three shifted stator sections to mimic a three phase (two pole) winding, a permanent magnet rotor, and a rotor position sensor. The permanent magnet rotor may be made of a rare earth magnet or a ceramic magnet. The rotor position sensor may be a Hall-effect sensor, a rotary encoder, or sensorless (i.e., measurement of back EMF in undriven coils by the motor controller). The BLDC motor controller may be in communication with the rotor position sensor and include a bank of transistors or thyristors and a chopper drive for complex control (i.e., variable speed drive and/or soft start capability).

Additionally, the PCM 55 may include a power supply (not shown). The power supply may include one or more DC/DC converters, each converter including an inverter, a transformer, and a rectifier for converting the DC power signal into an AC power signal and stepping the voltage from medium to low, such as less than or equal to one kV. The power supply may include multiple DC/DC converters in series to gradually step the DC voltage from medium to low. The low voltage DC signal may then be supplied to the motor controller.

The motor controller may be in data communication with one or more sensors (not shown) distributed throughout the downhole components 50-75. A pressure and temperature (PT) sensor may be in fluid communication with the water 100w entering the intake 65i. A gas to liquid ratio (GLR) sensor may be in fluid communication with the water 100w entering the intake 65i. A second PT sensor may be in fluid communication with the water 100w discharged from the outlet 65o. A temperature sensor (or PT sensor) may be in fluid communication with the lubricant to ensure that the motor and downhole controller are being sufficiently cooled. Multiple temperature sensors may be included in the PCM 55 for monitoring and recording temperatures of the various electronic components. A voltage meter and current (VAMP) sensor may be in electrical communication with the cable 80 to monitor power loss from the cable. A second VAMP sensor may be in electrical communication with the motor controller output to monitor performance of the motor controller. Further, one or more vibration sensors may monitor operation of the motor 50, the pump 65, and/or the seal section 60. A flow meter may be in fluid communication with the discharge 65o for monitoring a flow rate of the pump 65. Utilizing data from the sensors, the motor controller may monitor for adverse conditions, such as pump-off, gas lock, or abnormal power performance and take remedial action before damage to the pump 65 and/or motor 50 occurs.

The seal section 60 may isolate the water 100w being pumped through the pump 65 from the lubricant in the motor 50 by equalizing the lubricant pressure with the pressure of the water 100w. The seal section 60 may rotationally connect the motor shaft 135 to a drive shaft of the pump 65. The shaft seal may house a thrust bearing capable of supporting thrust load from the pump 65. The seal section 60 may be positive type or labyrinth type. The positive type may include an elastic, fluid-barrier bag to allow for thermal expansion of the motor lubricant during operation. The labyrinth type may include tube paths extending between a lubricant chamber and a water chamber providing limited fluid communication between the chambers.

The pump may include an inlet 65i. The inlet 65i may be standard type, static gas separator type, or rotary gas separator type depending on the GLR of the reservoir fluid. The standard type intake may include a plurality of ports allowing water 100w to enter a lower or first stage of the pump 65. The standard intake may include a screen to filter particulates from the water 100w. The static gas separator type may include a reverse-flow path to separate a gas portion of the reservoir fluid from a liquid portion of the reservoir fluid.

Figures 4A, 4B:
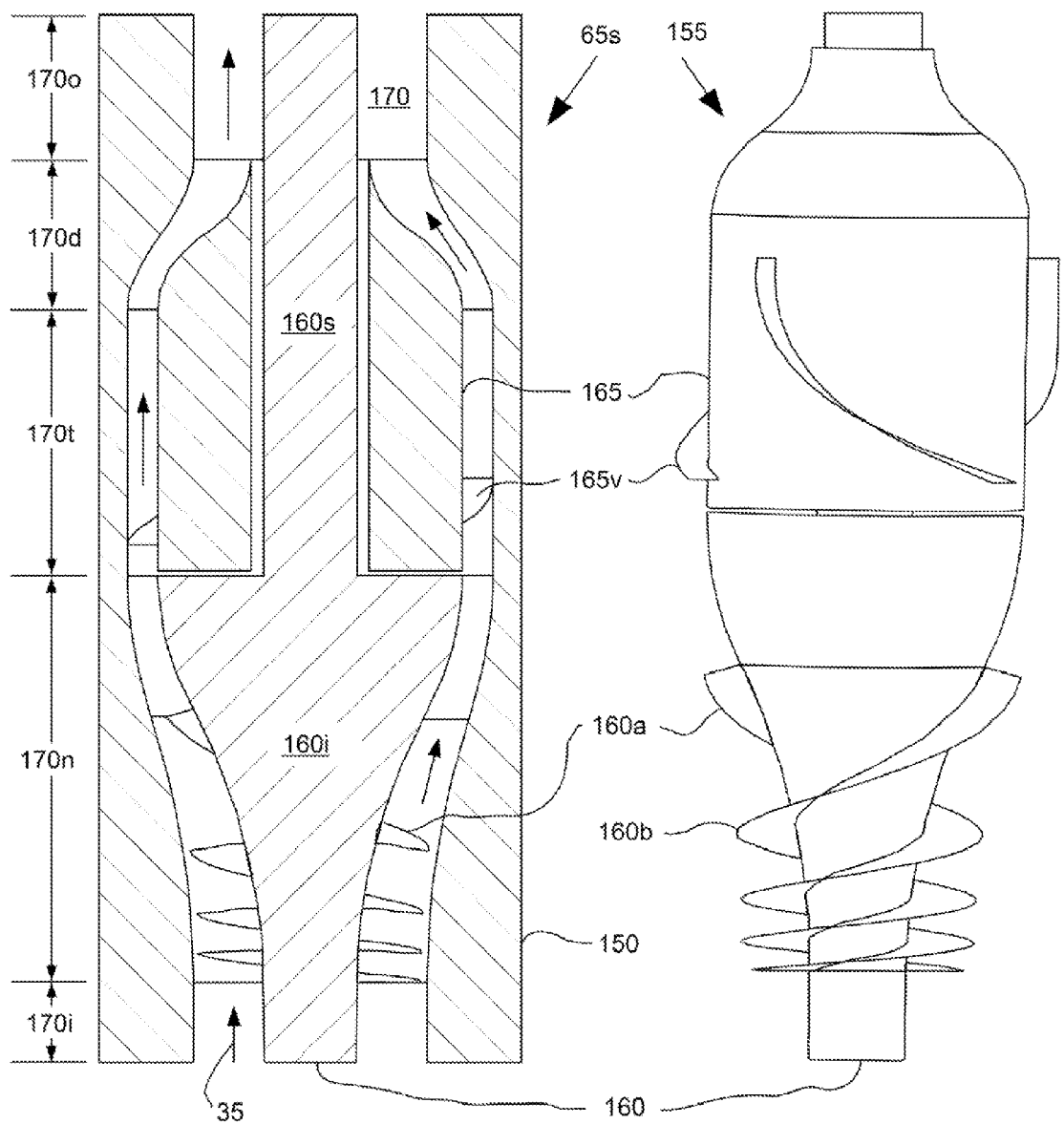
FIG. 4A is a cross-section of a stage of the pump.
FIG. 4B is an external view of a mandrel of the pump stage.

FIG. 4A is a cross-section of a stage 65s of the pump 65. FIG. 4B is an external view of a mandrel 155 of the pump stage 65s. The pump 65 may include one or more stages 65s, such as six. Each stage 65s may be longitudinally and rotationally connected, such as with threaded couplings or flanges (not shown). Each stage 65s may include a housing 150, a mandrel 155, and an annular passage 170 formed between the housing and the mandrel. The housing 150 may be tubular and have a bore therethrough. The mandrel 155 may be disposed in the housing 150. The mandrel 155 may include a rotor 160, one or more helicoidal rotor vanes 160a,b, a diffuser 165, and one or more diffuser vanes 165v. The rotor 160, housing 155, and diffuser 165 may each be made from a metal, alloy, or cermet corrosion and erosion resistant to the production fluid, such as steel, stainless steel, or a specialty alloy, such as chrome-nickel-molybdenum. Alternatively, the rotor, housing, and diffuser may be surface-hardened or coated to resist erosion.

The rotor 160 may include a shaft portion 160s and an impeller portion 160i. The portions 160i,s may be integrally formed. Alternatively, the portions 160i,s may be separately formed and longitudinally and rotationally connected, such as by a threaded connection. The rotor 160 may be supported from the diffuser 165 for rotation relative to the diffuser and the housing 150 by a hydrodynamic radial bearing (not shown) formed between an inner surface of the diffuser and an outer surface of the shaft portion 160s. The radial bearing may utilize production fluid or may be isolated from the production fluid by one or more dynamic seals, such as mechanical seals, controlled gap seals, or labyrinth seals. The diffuser 165 may be solid or hollow. If the diffuser is hollow, it may serve as a lubricant reservoir in fluid communication with the hydrodynamic bearing. Alternatively, one or more rolling element bearings, such as ball bearings (see bearing 140, discussed above), may be disposed between the diffuser 165 and shaft portion 160s instead of the hydrodynamic bearings.

The rotor vanes 160a,b may be formed with the rotor 160 and extend from an outer surface thereof or be disposed along and around an outer surface thereof. Alternatively the rotor vanes 160a,b may be deposited on an outer surface of the rotor after the rotor is formed, such as by spraying or weld-forming. The rotor vanes 160a,b may interweave to form a pumping cavity therebetween. A pitch of the pumping cavity may increase from an inlet 170i of the stage 65s to an outlet 170o of the stage. The rotor 160 may be longitudinally and rotationally coupled to the motor drive shaft and be rotated by operation of the motor. As the rotor is rotated, the water 100w may be pumped along the cavity from the inlet 170i toward the outlet 170o.

An outer diameter of the impeller 160i may increase from the inlet 170i toward the outlet 170o in a curved fashion until the impeller outer diameter corresponds to an outer diameter of the diffuser 165. An inner diameter of the housing 150 facing the impeller portion 160i may increase from the inlet 170i to the outlet 170o and the housing inner surface may converge toward the impeller outer surface, thereby decreasing an area of the passage 170 and forming a nozzle 170n. As the water 100w is forced through the nozzle 170n by the rotor vanes 160a,b, a velocity of the water 100w may be increased.

The stator may include the housing 150 and the diffuser 165. The diffuser 165 may be formed integrally with or separately from the housing 150. The diffuser 165 may be tubular and have a bore therethrough. The rotor 160 may have a shoulder between the impeller 160i and shaft 160s portions facing an end of the diffuser 165. The shaft portion 160s may extend through the diffuser 165. The diffuser 165 may be longitudinally and rotationally connected to the housing 150 by one or more ribs. An outer diameter of the diffuser 165 and an inner diameter of the housing 150 may remain constant, thereby forming a throat 170t of the passage 170. The diffuser vanes 165v may be formed with the diffuser 165 and extend from an outer surface thereof or be disposed along and around an outer surface thereof. Alternatively the diffuser vanes 165v may be deposited on an outer surface of the diffuser after the diffuser is formed, such as by spraying or weld-forming. Each diffuser vane 165v may extend along an outer surface of the diffuser 165 and curve around a substantial portion of the circumference thereof. Cumulatively, the diffuser vanes 165v may extend around the entire circumference of the diffuser 165. The diffuser vanes 165v may be oriented to negate swirl in the flow of water 100w caused by the rotor vanes 160a,b, thereby minimizing energy loss due to turbulent flow of the water 100w. In other words, the diffuser vanes 165v may serve as a vortex breaker. Alternatively, a single helical diffuser vane may be used instead of a plurality of diffuser vanes 165v.

An outer diameter of the diffuser 165 may decrease away from the inlet 170i to the outlet 170o in a curved fashion until an end of the diffuser 165 is reached and an outer surface of the shaft portion 160s is exposed to the passage 170. An inner diameter of the housing 150 facing the diffuser 165 may decrease away from the inlet 170i to the outlet 170o and the housing inner surface may diverge from the diffuser outer surface, thereby increasing an area of the passage 170 and forming a diffuser 170d. As the water 100w flows through the diffuser 170d, a velocity of the water 100w may be decreased. Inclusion of the Venturi 170n,t,d may also minimize fluid energy loss in the water discharged from the rotor vanes 160a,b.

As discussed above, for compactness, the motor 50 and pump 65 may operate at the high speed so that the compact pump 65 may generate the necessary head to pump the water 100w to the outlet line 35 while minimizing a diameter thereof.

The isolation device 70 may include a packer, an anchor, and an actuator. The actuator may include a brake, a cam, and a cam follower. The packer may be made from a polymer, such as a thermoplastic or elastomer, such as rubber, polyurethane, or PTFE. The cam may have a profile, such as a J-slot and the cam follower may include a pin engaged with the J-slot. The anchor may include one or more sets of slips, and one or more respective cones. The slips may engage the production tubing 10t, thereby rotationally connecting the downhole components 50-75 to the production tubing. The slips may also longitudinally support the downhole components 50-75. The brake and the cam follower may be longitudinally connected and may also be rotationally connected. The brake may engage the production tubing 10t as the downhole components 50-75 are being run-into the wellbore. The brake may include bow springs for engaging the production tubing. Once the downhole components 50-75 have reached deployment depth, the cable 80 may be raised, thereby causing the cam follower to shift from a run-in position to a deployment position. The cable 80 may then be relaxed, thereby, causing the weight of the downhole components 50-75 to compress the packer and the slips and the respective cones, thereby engaging the packer and the slips with the production tubing 10t. The isolation device 70 may then be released by pulling on the cable 80, thereby again shifting the cam follower to a release position. Continued pulling on the cable 80 may release the packer and the slips, thereby freeing the downhole components 50-75 from the production tubing 10t.

Alternatively, the actuator may include a piston and a control valve. Once the downhole components 50-75 have reached deployment depth, the motor 50 and pump 65 may be activated. The control valve may remain closed until the pump exerts a predetermined pressure on the valve. The predetermined pressure may cause the piston to compress the packer and the slips and cones, thereby engaging the packer and the slips with the production tubing. The valve may further include a vent to release pressure from the piston once pumping has ceased, thereby freeing the slips and the packer from the production tubing. Additionally, the actuator may further be configured so that relaxation of the cable 80 also exerts weight to further compress the packer, slips, and cones and release of the slips may further include exerting tension on the cable 80.

Additionally, the isolation device 70 may include a bypass vent (not shown) for releasing gas separated by the inlet 65i that may collect below the isolation device and preventing gas lock of the pump 65. A pressure relief valve (not shown) may be disposed in the bypass vent. Additionally, a downhole tractor (not shown) may be integrated into the cable 80 to facilitate the delivery of the downhole components 50-75, especially for highly deviated wells, such as those having an inclination of more than forty-five degrees or dogleg severity in excess of five degrees per one hundred feet. The drive and wheels of the tractor may be collapsed against the cable and deployed when required by a signal from the surface.

In operation, to install the ESP 1, a workover rig (not shown) and the ESP 1 may be deployed to the wellsite. Since the cable 80 may include only two conductors, the cable 80 may be delivered wound onto a drum (not shown). The wellhead 15 may be opened. The components 50-75 may be suspended over the wellbore 5 from the workover rig and an end of the cable 80 may be connected to the cablehead 75. The cable 80 may be unwound from the drum, thereby lowering the downhole components 50-75 into the wellbore 5 inside of the production tubing 10t. Once the downhole components 50-75 have reached the desired depth proximate to the reservoir 25, the wellhead 15 may be closed and the conductors of the cable 80 may be connected to the surface controller 45.

The isolation device 70 may then be set. Once the isolation device 70 is set, the motor 50 may then be started (if not already started to set the isolation device). If the motor controller is variable, the motor controller may soft start the motor 50. As the pump 65 is operating, the motor controller may send data from the sensors to the surface so that the operator may monitor performance of the pump. If the motor controller is variable, a speed of the motor 50 may be adjusted to optimize performance of the pump 65. Alternatively, the surface operator may instruct the motor controller to vary operation of the motor. The pump 65 may pump the water 100w through the production tubing 10t and the wellhead 15 into the outlet 35, thereby lowering a level of the water 100w and reducing hydrostatic pressure of the water 100w on the formation 25. The pump 65 may be operated until the water level is lowered to the inlet 65i of the pump, thereby allowing natural production from the reservoir 25. The operator may then send instructions to the motor controller to shut down the pump 65 or simply cut power to the cable 80. The isolation device 70 may then be unset (if not unset by shutdown of the pump) by winding the drum to exert sufficient tension in the cable 80. The cable 80 may be wound, thereby raising the downhole components 50-75 from the wellbore 5. The workover rig and the ESP 1 may then be redeployed to another wellsite.

Advantageously, deployment of the downhole components 50-75 using the cable 80 inside of the production tubing 10t instead of removing the production tubing string and redeploying the production tubing string with a permanently mounted artificial lift system reduces the required size of the workover rig and the capital commitment to the well. Deployment and removal of the ESP 1 to/from the wellsite may be accomplished in a matter of hours, thereby allowing multiple wells to be dewatered in a single day. Transmitting a DC power signal through the cable 80 reduces the required diameter of the cable, thereby allowing a longer length of the cable 80 (i.e., five thousand to eight thousand feet) to be spooled onto a drum, and easing deployment of the cable 80.

While the foregoing is directed to embodiments of the present invention, other and further embodiments of the invention may be devised without departing from the basic scope thereof, and the scope thereof is determined by the claims that follow.

The invention claimed is:

1. A method of unloading liquid from a reservoir, comprising:
    deploying a pumping system into a wellbore to a location proximate the reservoir using a cable, wherein the pumping system comprises a multi-section motor, an isolation device, and a pump;
    supplying a power signal from the surface to the motor via the cable and sequentially operating each section of the motor to mimic a multi-phase motor, thereby driving the pump and lowering a liquid level in the tubular string to a level proximate the reservoir; and
    setting the isolation device before or as a result of supplying the power signal, thereby rotationally connecting the pumping system to a tubular string disposed in the wellbore and isolating an inlet of the pump from an outlet of the pump.

2. The method of claim 1, further comprising:
    ceasing supply of the power signal;
    unsetting the isolation device after or as a result of ceasing the power signal supply; and
    removing the pumping system from the wellbore using the cable.

3. The method of claim 1, wherein:
    the power signal is medium voltage DC via the cable,
    the pumping assembly further comprises a power conversion module (PCM), and
    the PCM outputs a low voltage signal to the motor.

4. The method of claim 1, wherein motor and the pump are operated at greater than or equal to ten thousand RPM.

5. The method of claim 1, wherein a maximum outer diameter of the pump assembly and the cable is less than or equal to two inches.

6. The method of claim 1, further comprising controlling a speed of the motor.

7. The method of claim 1, wherein:
    the pumping system comprises a sensor, and
    the method further comprises transmitting a measurement by the sensor to the surface via the cable.

8. The method of claim 1, wherein the isolation device longitudinally connects the pumping system to the tubular string, thereby supporting a weight of the pumping system.

9. A pumping system, comprising:
    a submersible multi-section electric motor operable to rotate a drive shaft, wherein each section is incrementally oriented so that the sections are operable to mimic a multi-phase motor;
    a pump rotationally connected to the drive shaft;
    an isolation device operable to engage a tubular string, thereby fluidly isolating an inlet of the pump from an outlet of the pump and rotationally connecting the motor and the pump to the tubular string; and
    a cable having two or less conductors, a strength sufficient to support the motor, the pump, and the isolation device, and in electrical communication with the motor.

10. The pumping system of claim 9, wherein a maximum outer diameter of the motor, pump, isolation device, and cable is less than or equal to two inches.

11. The pumping system of claim 9, further comprising a power conversion module (PCM) operable to:
    receive a medium voltage DC power signal from the cable, and
    supply a low voltage power signal to the motor.

12. The pumping system of claim 11, wherein the PCM is operable to vary a speed of the motor.

13. The pumping system of claim 9, wherein the motor is a switched reluctance motor.

14. The pumping system of claim 9, wherein the motor and the pump are operable at greater than or equal to ten thousand RPM.

15. The pumping system of claim 9, further comprising:
    a sensor; and
    a modem operable to send a measurement from the sensor along the cable.

16. The pumping system of claim 9, wherein the isolation device is further operable to support the weight of the motor, the pump, and the isolation device.

17. The pumping system of claim 9, wherein each section comprises:
- a submersible tubular housing;
- a stator core disposed within the housing and having one or more lobes, each lobe having a winding wrapped therearound; and
- a rotor disposed within the housing and comprising a shaft and a rotor core, the rotor core having two or more lobes.

18. The pumping system of claim 9, wherein the pump further comprises one or more stages, each stage comprising:
- a tubular housing;
- a mandrel disposed in the housing and comprising:
  - a rotor rotatable relative to the housing and having:
    - an impeller portion,
    - a shaft portion, and
    - one or more helicoidal vanes extending along the impeller portion,
  - a diffuser:
    - connected to the housing,
    - having the shaft portion extending therethrough, and
    - having one or more vanes operable to negate swirl imparted to fluid pumped through the impeller portion; and
- a fluid passage formed between the housing and the mandrel and having a nozzle section, a throat section, and a diffuser section.

19. A method of unloading liquid from a reservoir, comprising:
- deploying a pumping system into a wellbore to a location proximate the reservoir using a cable, wherein the pumping system comprises a multi-section motor, an isolation device, and a pump;
- supplying a power signal from the surface to the motor via the cable and sequentially operating each section of the motor to mimic a multi-phase motor, thereby driving the pump and lowering a liquid level in the tubular string to a level proximate the reservoir;
- ceasing supply of the power signal;
- unsetting the isolation device after or as a result of ceasing the power signal supply; and
- removing the pumping system from the wellbore using the cable.

20. A method of unloading liquid from a reservoir, comprising:
- deploying a pumping system into a wellbore to a location proximate the reservoir using a cable, wherein the pumping system comprises a multi-section motor, an isolation device, and a pump; and
- supplying a power signal from the surface to the motor via the cable and sequentially operating each section of the motor to mimic a multi-phase motor, thereby driving the pump and lowering a liquid level in the tubular string to a level proximate the reservoir,
- wherein:
  - the power signal is medium voltage DC via the cable,
  - the pumping assembly further comprises a power conversion module (PCM), and
  - the PCM outputs a low voltage signal to the motor.

21. A method of unloading liquid from a reservoir, comprising:
- deploying a pumping system into a wellbore to a location proximate the reservoir using a cable, wherein the pumping system comprises a multi-section motor, an isolation device, and a pump; and
- supplying a power signal from the surface to the motor via the cable and sequentially operating each section of the motor to mimic a multi-phase motor, thereby driving the pump and lowering a liquid level in the tubular string to a level proximate the reservoir,
- wherein motor and the pump are operated at greater than or equal to ten thousand RPM.

22. A method of unloading liquid from a reservoir, comprising:
- deploying a pumping system into a wellbore to a location proximate the reservoir using a cable, wherein the pumping system comprises a multi-section motor, an isolation device, and a pump; and
- supplying a power signal from the surface to the motor via the cable and sequentially operating each section of the motor to mimic a multi-phase motor, thereby driving the pump and lowering a liquid level in the tubular string to a level proximate the reservoir,
- wherein:
  - the pumping system comprises a sensor, and
  - the method further comprises transmitting a measurement by the sensor to the surface via the cable.

23. A method of unloading liquid from a reservoir, comprising:
- deploying a pumping system into a wellbore to a location proximate the reservoir using a cable, wherein the pumping system comprises a multi-section motor, an isolation device, and a pump; and
- supplying a power signal from the surface to the motor via the cable and sequentially operating each section of the motor to mimic a multi-phase motor, thereby driving the pump and lowering a liquid level in the tubular string to a level proximate the reservoir,
- wherein the isolation device longitudinally connects the pumping system to the tubular string, thereby supporting a weight of the pumping system.

* * * * *